United States Patent
Annamalai et al.

(10) Patent No.: US 11,230,976 B2
(45) Date of Patent: Jan. 25, 2022

(54) INTEGRATED FUEL NOZZLE CONNECTION

(71) Applicant: General Electric Company, Schenectady, NY (US)

(72) Inventors: Subramanian Annamalai, Greenville, SC (US); Lucas John Stoia, Taylors, SC (US); Mohan Krishna Bobba, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 183 days.

(21) Appl. No.: 15/649,853

(22) Filed: Jul. 14, 2017

(65) Prior Publication Data

US 2019/0017444 A1    Jan. 17, 2019

(51) Int. Cl.
| | |
|---|---|
| *F02C 7/36* | (2006.01) |
| *F02C 7/268* | (2006.01) |
| *F02C 7/057* | (2006.01) |
| *F02C 3/13* | (2006.01) |
| *F02K 1/30* | (2006.01) |

(Continued)

(52) U.S. Cl.
CPC .............. *F02C 7/36* (2013.01); *F02C 3/13* (2013.01); *F02C 7/057* (2013.01); *F02C 7/268* (2013.01); *F02K 1/30* (2013.01); *F23K 5/14* (2013.01); *F23R 3/283* (2013.01); *F23K 2300/202* (2020.05); *F23R 2900/00005* (2013.01)

(58) Field of Classification Search
CPC .... F02C 7/36; F02C 3/13; F02C 7/057; F02C 7/268; F02K 1/30; F23K 5/14; F23K 2301/202; F23R 3/283; F23R 2900/00005
See application file for complete search history.

(56) References Cited

U.S. PATENT DOCUMENTS

| | | | |
|---|---|---|---|
| 3,316,437 A | 4/1967 | Weins | |
| 6,354,085 B1* | 3/2002 | Howell | F23R 3/283 239/590 |
| 7,703,287 B2 | 4/2010 | Haggerty et al. | |

(Continued)

FOREIGN PATENT DOCUMENTS

| | | |
|---|---|---|
| EP | 2362141 A1 | 8/2011 |
| EP | 2397684 A1 | 12/2011 |

(Continued)

OTHER PUBLICATIONS

European Search Report Corresponding to Application No. 18180413 dated Nov. 30, 2018.

(Continued)

*Primary Examiner* — Arun Goyal
*Assistant Examiner* — Henry Ng
(74) *Attorney, Agent, or Firm* — Dority & Manning, P.A.

(57) ABSTRACT

A gas turbine includes a compressor, a turbine, and a combustor disposed downstream from the compressor and upstream from the turbine. The combustor includes an end cover. The combustor also includes a flange. The flange includes an internal fluid passage defined within the flange and the flange is coupled to an internal face of the end cover. A fuel port is integrally joined with the flange. The fuel port extends through the end cover between the flange and an inlet positioned outside of the end cover. The inlet of the fuel port is in fluid communication with the internal fluid passage of the flange.

14 Claims, 5 Drawing Sheets

(51) Int. Cl.
*F23R 3/28* (2006.01)
*F23K 5/14* (2006.01)

(56) References Cited

U.S. PATENT DOCUMENTS

| | | | |
|---|---|---|---|
| 8,393,154 B2 | 3/2013 | Gandza | |
| 8,539,774 B2 | 9/2013 | Carlisle | |
| 8,567,646 B1 | 10/2013 | Cray | |
| 8,662,119 B2 | 3/2014 | Burris et al. | |
| 8,776,369 B2 | 7/2014 | Michinishi et al. | |
| 8,950,425 B1 | 2/2015 | Jansen | |
| 9,133,770 B2 | 9/2015 | Henkle et al. | |
| 9,316,397 B2 | 4/2016 | Stewart et al. | |
| 9,422,899 B2 | 8/2016 | Kim et al. | |
| 9,429,326 B2 | 8/2016 | Kato et al. | |
| 9,441,544 B2 | 9/2016 | McConnaughhay et al. | |
| 9,500,370 B2 | 11/2016 | Barker | |
| 9,650,961 B2* | 5/2017 | Hirata | F23R 3/283 |
| 2010/0044472 A1* | 2/2010 | Smith | F02M 53/04 |
| | | | 239/589 |
| 2011/0203283 A1* | 8/2011 | Bottcher | F23D 23/00 |
| | | | 60/737 |
| 2011/0203285 A1 | 8/2011 | Böttcher et al. | |
| 2012/0137691 A1 | 6/2012 | Böttcher et al. | |
| 2012/0180494 A1* | 7/2012 | Bailey | F23K 5/007 |
| | | | 60/772 |
| 2012/0291440 A1* | 11/2012 | Moehrle | F23R 3/60 |
| | | | 60/737 |
| 2013/0305725 A1 | 11/2013 | Berry | |
| 2014/0123668 A1 | 5/2014 | Huntington et al. | |
| 2014/0123669 A1 | 5/2014 | Huntington et al. | |
| 2014/0216038 A1 | 8/2014 | Keener et al. | |
| 2014/0250981 A1 | 9/2014 | Overby et al. | |
| 2015/0000286 A1* | 1/2015 | LeBegue | F23R 3/28 |
| | | | 60/742 |
| 2015/0000299 A1 | 1/2015 | Zuo et al. | |
| 2015/0052980 A1 | 2/2015 | Sheldon et al. | |
| 2015/0082770 A1* | 3/2015 | Igarashi | F23R 3/286 |
| | | | 60/39.463 |
| 2015/0096983 A1 | 4/2015 | Moy et al. | |
| 2015/0135720 A1 | 5/2015 | Papple et al. | |
| 2015/0308349 A1 | 10/2015 | Rohrssen et al. | |
| 2016/0223202 A1 | 8/2016 | Borchert et al. | |
| 2016/0245513 A1* | 8/2016 | Buchheim | F23K 5/18 |
| 2016/0281989 A1 | 9/2016 | Johnson | |
| 2016/0341626 A1 | 11/2016 | Thakkar et al. | |
| 2018/0142893 A1* | 5/2018 | Kumagai | F23R 3/283 |

FOREIGN PATENT DOCUMENTS

| | | |
|---|---|---|
| GB | 614553 A | 12/1948 |
| WO | WO99/19670 A2 | 4/1999 |
| WO | WO2015/012908 | 1/2015 |

OTHER PUBLICATIONS

European Office Action Corresponding to Application No. 18180413 dated Nov. 26, 2020.

* cited by examiner

INTEGRATED FUEL NOZZLE CONNECTION

FIELD

The present disclosure generally involves an integrated fuel connection for supplying fuel to a fuel nozzle assembly of a turbomachine.

BACKGROUND

Gas turbines generally operate by combusting a fuel and air mixture in one or more combustors to create a high-energy combustion gas that passes through a turbine, thereby causing a turbine rotor shaft to rotate. The rotational energy of the rotor shaft may be converted to electrical energy via a generator coupled to the rotor shaft. Each combustor generally includes fuel nozzles that provide for premixing of the fuel and air upstream of a combustion zone, as a means to keep nitrogen oxide (NOx) emissions low.

Gaseous fuels, such as natural gas, often are employed as a combustible fluid in gas turbine engines used to generate electricity. Typical fuel supply systems for providing gaseous fuels to the fuel nozzles of a combustor include a sealed connection positioned within a head end of the combustor, such that if the seal fails or otherwise permits the fuel to escape from the connection within the head end, flame holding within the head end of the combustor may occur.

BRIEF DESCRIPTION

Aspects and advantages are set forth below in the following description, or may be obvious from the description, or may be learned through practice.

According to one embodiment, a gas turbine is provided. The gas turbine includes a compressor, a turbine, and a combustor disposed downstream from the compressor and upstream from the turbine. The combustor includes an end cover. The combustor also includes a flange. The flange includes an internal fluid passage defined within the flange and the flange is coupled to an internal face of the end cover. A fuel port is integrally joined with the flange. The fuel port extends through the end cover between the flange and an inlet positioned outside of the end cover. The inlet of the fuel port is in fluid communication with the internal fluid passage of the flange.

According to another embodiment, a combustor for a turbomachine is provided. The combustor includes an end cover. The combustor also includes a flange. The flange includes an internal fluid passage defined within the flange and the flange is coupled to an internal face of the end cover. A fuel port is integrally joined with the flange. The fuel port extends through the end cover between the flange and an inlet positioned outside of the end cover. The inlet of the fuel port is in fluid communication with the internal fluid passage of the flange.

Those of ordinary skill in the art will better appreciate the features and aspects of such embodiments, and others, upon review of the specification.

BRIEF DESCRIPTION OF THE DRAWINGS

A full and enabling disclosure of various embodiments, including the best mode thereof to one skilled in the art, is set forth more particularly in the remainder of the specification, including reference to the accompanying figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

Although exemplary embodiments of the present disclosure will be described generally in the context of a land based power generating gas turbine combustor for purposes of illustration, one of ordinary skill in the art will readily appreciate that embodiments of the present disclosure may be applied to any style or type of combustor for a turbomachine and are not limited to combustors or combustion systems for land based power generating gas turbines unless specifically recited in the claims.

Figure 1:
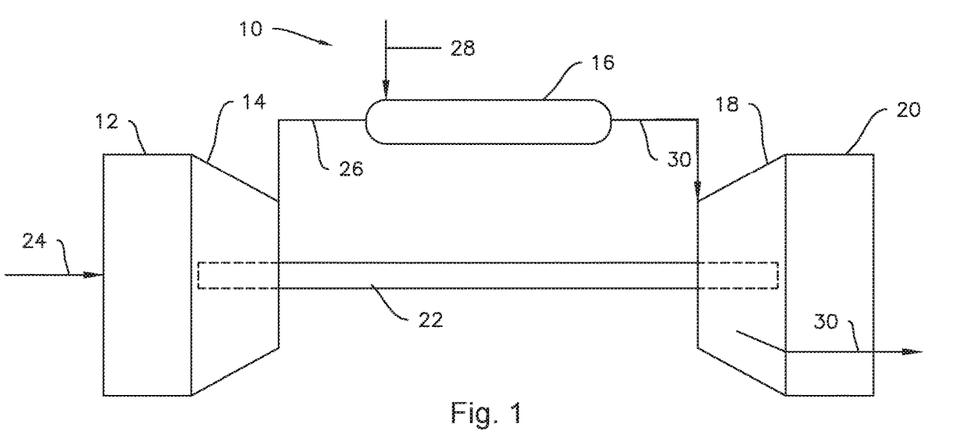
FIG. 1 is a functional block diagram of an exemplary gas turbine that may incorporate various embodiments of the present disclosure.

Referring now to the drawings, FIG. 1 illustrates a schematic diagram of an exemplary gas turbine 10. The gas turbine 10 generally includes an inlet section 12, a compressor 14 disposed downstream of the inlet section 12, at least one combustor 16 disposed downstream of the compressor 14, a turbine 18 disposed downstream of the combustor 16 and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustor 16. At least a portion of the compressed air 26 is mixed with a fuel 28 within the combustor 16 and burned to produce combustion gases 30. The combustion gases 30 flow from the combustor 16 into the turbine 18, wherein energy (kinetic and/or thermal) is transferred from the combustion gases 30 to rotor blades (not shown), thus causing shaft 22 to rotate. The mechanical rotational energy may then be used for various purposes such as to power the compressor 14 and/or to generate electricity. The combustion gases 30 exiting the turbine 18 may then be exhausted from the gas turbine 10 via the exhaust section 20.

Figure 2:
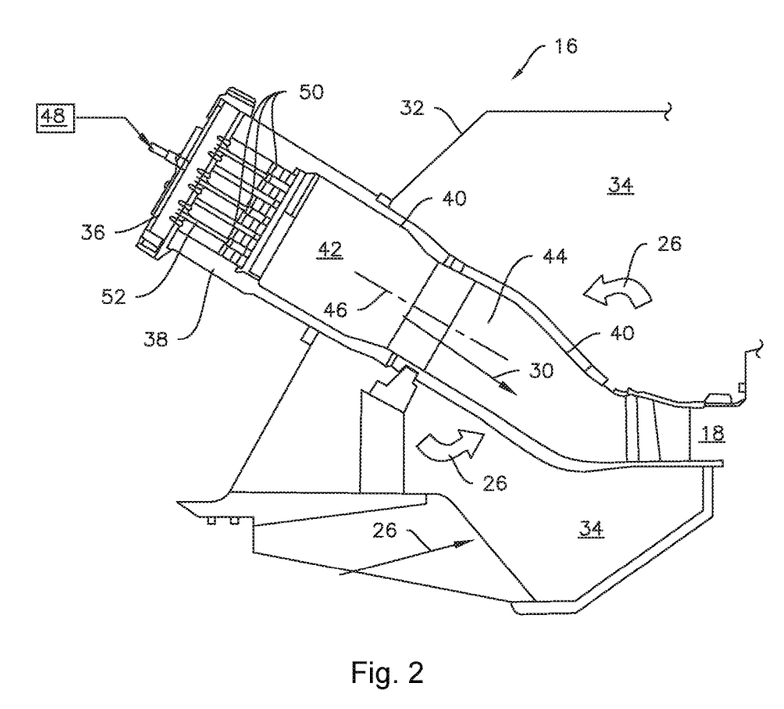
FIG. 2 is a simplified cross-section side view of an exemplary combustor as may incorporate various embodiments of the present disclosure.

As shown in FIG. 2, the combustor 16 may be at least partially surrounded by an outer casing 32 such as a compressor discharge casing. The outer casing 32 may at least partially define a high pressure plenum 34 that at least partially surrounds various components of the combustor 16. The high pressure plenum 34 may be in fluid communication with the compressor 14 (FIG. 1) so as to receive the compressed air 26 therefrom. An end cover 36 may be coupled to the outer casing 32. In some embodiments, the end cover 36 may be a separate component coupled, e.g., fastened, to the outer casing 32. In other embodiments, the end cover 36 may be contiguous with the outer casing 32, e.g., the combustor 16 may be entirely enclosed within the outer casing 32 and the end cover 36 may be a portion of the outer casing 32. In some embodiments, the outer casing 32 and the end cover 36 may at least partially define a head end volume or portion 38 of the combustor 16.

In some embodiments, the head end portion 38 is in fluid communication with the high pressure plenum 34 and/or the compressor 14. One or more liners or ducts 40 may at least partially define a combustion chamber or zone 42 for combusting the fuel-air mixture and/or may at least partially define a hot gas path 44 through the combustor 16, for directing the combustion gases 30 towards an inlet to the turbine 18.

In various embodiments, the combustor 16 includes at least one fuel nozzle assembly 50. As shown in FIG. 2, the fuel nozzle assembly 50 is disposed within the outer casing 32 downstream from and/or axially spaced from the end cover 36 with respect to axial centerline 46 of the combustor 16 and upstream from the combustion chamber 42. In particular embodiments, the fuel nozzle assembly 50 may be in fluid communication with a gas fuel supply 48 via one or more fluid conduits 52. In some embodiments, the fluid conduit(s) 52 may be fluidly coupled and/or connected at one end to the end cover 36.

Figure 3:
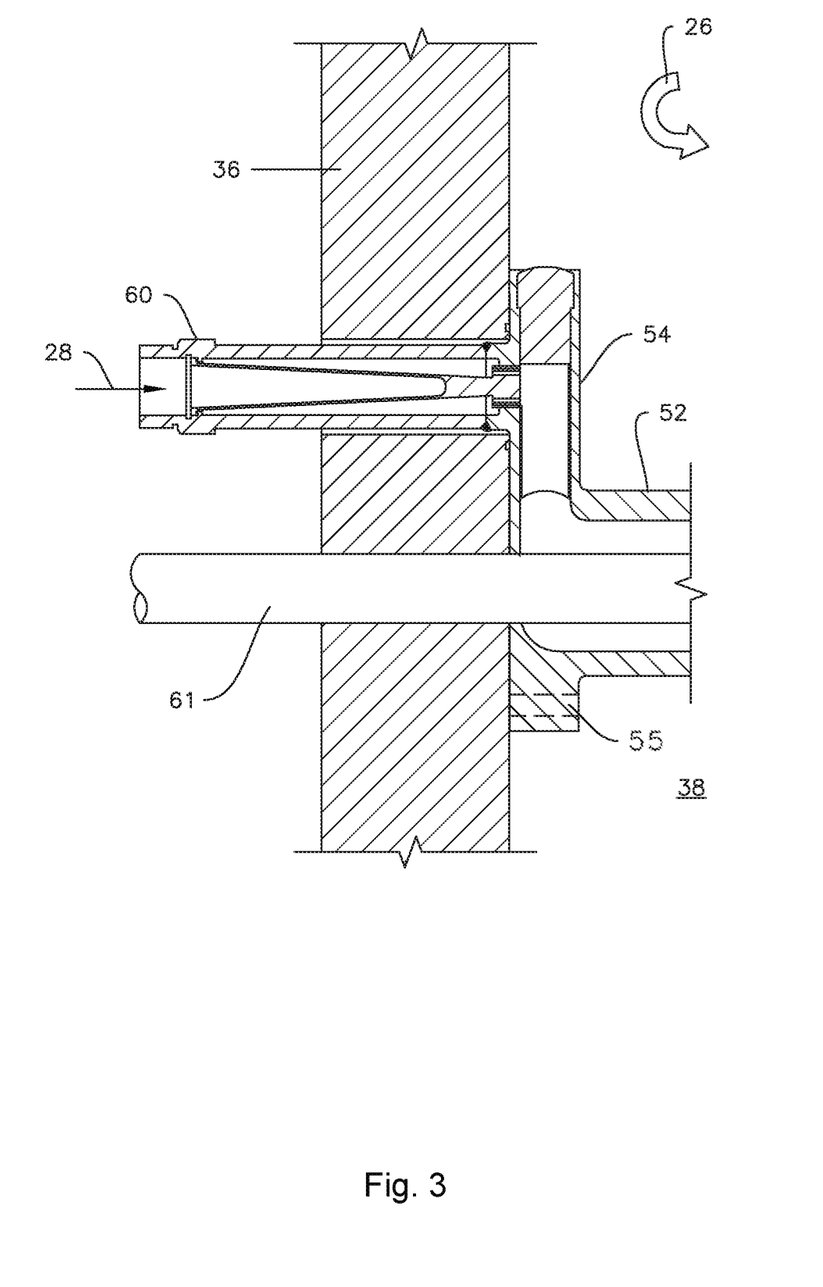
FIG. 3 is a cross sectioned side view of a portion of the combustor of FIG. 2.

An example embodiment of a connection for a fluid conduit 52 is illustrated in FIG. 3. As shown in FIG. 3, in some example embodiments, the fluid conduit 52 may be part of a dual fuel system, e.g., both a fuel port 60 for gaseous fuel may be provided as well as a liquid fuel conduit 61. However, in alternate embodiments, the fuel port 60 may be the only fuel connection. Further, it is to be understood that the fuel port 60 may be used to supply any suitable fuel and is not necessarily limited to gaseous fuel.

Figure 4:
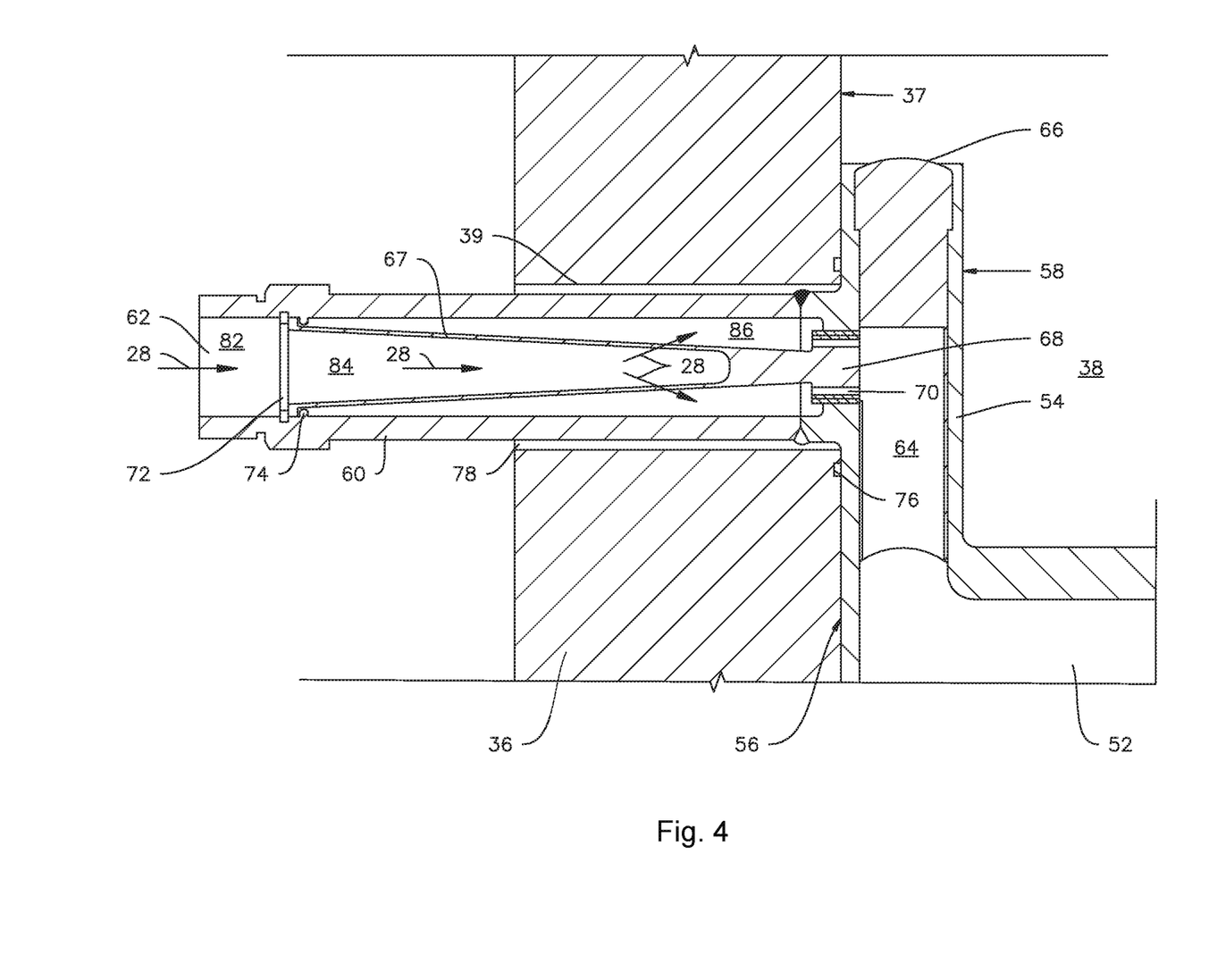
FIG. 4 is an enlarged view of a portion of FIG. 3.

As illustrated in FIGS. 3 and 4, embodiments may include a flange 54 coupled to an internal face 37 of the end cover 36. As mentioned above, the head end portion 38 which is partially defined by the end cover 36 may be in fluid communication with the compressor 14. In such embodiments, the pressure within the head end 38 may be significantly higher than the ambient pressure around the gas turbine 10 (FIG. 1). Accordingly, the internal face 37 of the end cover 36 is the surface of the end cover 36 which faces the head end 38 and is exposed to the compressed air 26. The flange 54 may be coupled to the internal face 37 using bolts or other fasteners (not shown), as are understood in the art. The flange 54 may include a plurality of holes 55 for receiving the fasteners. The structure and intended function of such fasteners are generally understood by those of ordinary skill in the art and are not described in further detail herein.

Figure 6:
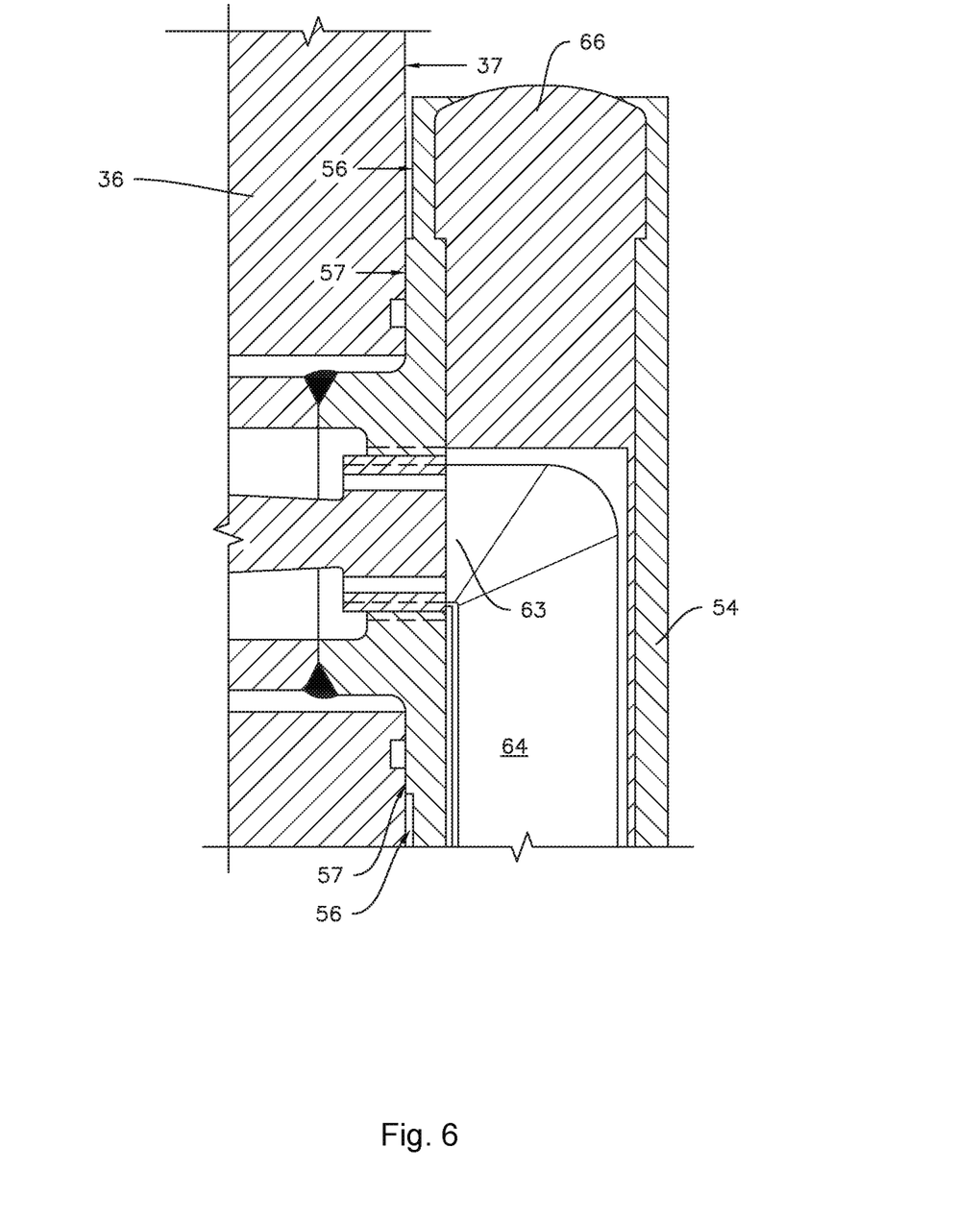
FIG. 6 is an enlarged view of a portion of FIG. 4.

In particular embodiments, the flange 54 may extend between a first side 56 and a second side 58 opposing the first side 56. The first side 56 of the flange 54 may be positioned abutting the internal face 37 of the end cover 36, e.g., when the flange 54 is coupled to the end cover 37. In such embodiments, the abutting surfaces, e.g., the first side 56 of the flange 54 and the internal face 37 of the end cover 36, may create a potential leak path for compressed air 26 to escape from the head end 38 into the ambient environment. In order to prevent or minimize leakage of compressed air 26 from the head end 38, a sealing member (not shown) may be provided within a seal groove 76. As best seen in FIGS. 4 and 6, in the illustrated example embodiments the seal groove 76 is formed in the internal face 37 of the end cover 36, however, in alternative embodiments, the seal groove 76 may be formed in the first side 56 of the flange 54. In some embodiments, e.g., as illustrated in FIG. 6, the first side 56 of the flange 54 may include a protruding sealing surface 57. The protruding sealing surface 57 may advantageously provide a more concentrated load transfer of the fastening load to the sealing member.

Still with reference to FIGS. 3 and 4, the flange 54 may include an internal fluid passage 64 defined within the flange 54. The internal fluid passage 64 may extend between a respective one of the fluid conduits 52 and an inlet 63 (FIG. 6) formed in or proximate to the first side 56 of the flange 54. The fluid conduit 52 may be in fluid communication with a respective one of the fuel nozzles 50. The internal fluid passage 64 may be in fluid communication with the fuel port 60.

Embodiments of the fuel nozzle connection may be integrated in that the fuel port 60 may be integrally joined with the flange 54 such that the fuel port 60 and the flange 54 form a single unitary piece. For example, as illustrated in FIGS. 3 and 4, the fuel port 60 may be formed separately from the flange 54 and welded to the flange 54. In additional embodiments, the fuel port 60 and the flange 54 may be integrally joined into a single unitary piece using any suitable method, such as by casting the flange 54 and the fuel port 60 as a single piece, or by forming the fuel port 60 and the flange 54 using additive manufacturing techniques such as but not limited to direct metal laser melting (DMLM), selective laser sintering (SLS), or other suitable techniques. Integrating the fuel nozzle connection, e.g., by integrally joining the fuel port 60 with the flange 54, may advantageously prevent or reduce leakage of fuel 28 into the head end 38. The head end 38 may experience elevated temperatures such that if fuel 28 escapes into the head end 38, it may result in flame holding. Thus, integrally joining the fuel port 60 with the flange 54 may advantageously prevent or reduce flame holding in the head end 38.

Figure 5:
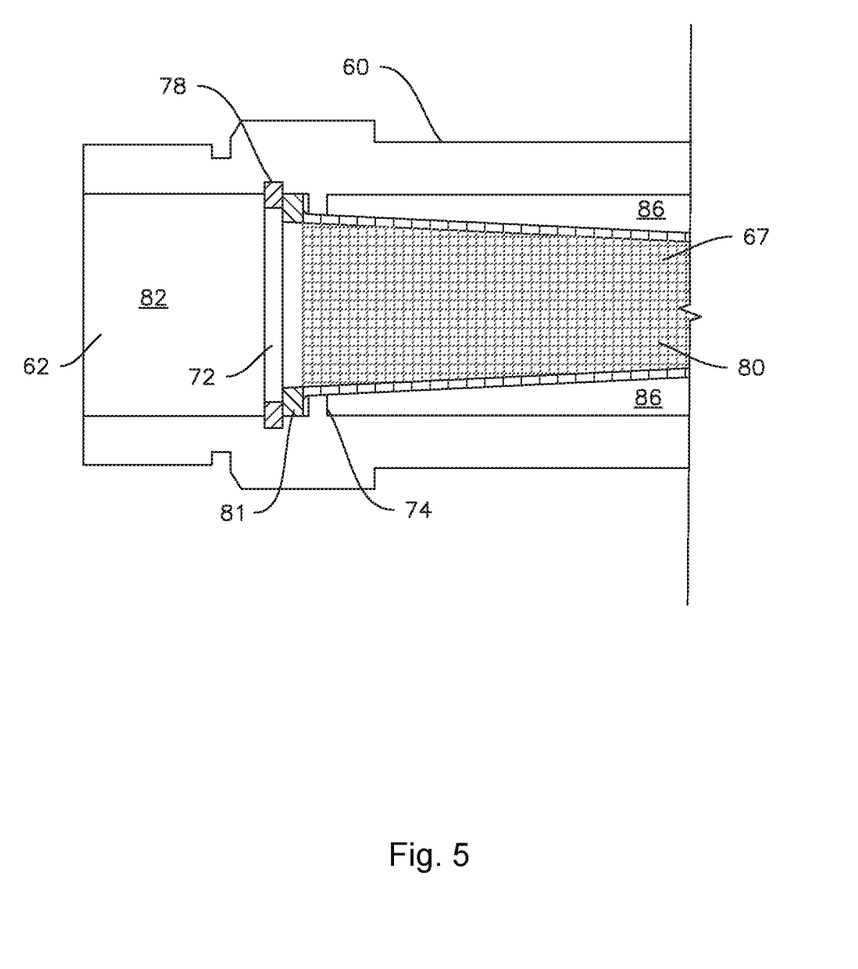
FIG. 5 is an enlarged view of a portion of FIG. 4.

As best seen in FIGS. 4 and 5, the fuel port 60 may include an inlet 62, the inlet 62 configured for connecting to a fuel supply such as fuel supply 48 (FIG. 2) and providing fluid communication with the internal fluid passage 64 of the flange 54. The fuel port 60 may extend through the end cover 36 between the flange 54 and the inlet 62, where the inlet 62 is positioned outside of the end cover 36. As noted above, the internal face 37 of the end cover 36 faces the head end 38, similarly, the inlet 62 may be positioned outside of the end cover 36 in that the inlet 62 is on the opposite side of the end cover 36 from the head end 38. Thus, it should be understood that as used herein with respect to the end cover 36, terms such as "internal" refer to a side of the end cover 36 that adjoins the head end 38, while terms such as "external" or "outside" refer to an opposite side of the end cover 36, away from the head end 38.

In some embodiments, the fuel port 60 may extend through a bore 39 defined in the end cover 36. In such embodiments, the seal groove 76 may surround the bore 39 of the end cover 36. As noted above, the seal groove 76 is not necessarily formed in the internal face 37 of the end cover 36, the seal groove 76 may be provided, e.g., in the first side 56 of the flange 54. In some embodiments, the fuel port 60 may be offset from the bore 39 of the end cover 36 such that an annular passage 78 is defined between the fuel port 60 and the bore 39 of the end cover 36. For example, an external dimension of the fuel port 60, such as a diameter of the fuel port 60 in embodiments where the fuel port 60 is cylindrical, may be smaller than a corresponding dimension of the bore 39 of the end cover 36.

As shown in FIGS. 3 and 4, the fuel port 60 may extend between the inlet 62 and the first side 56 of the flange 54. The fluid conduit 52 may extend between the second side 58 of the flange 54 and a fuel nozzle 50 (FIG. 2).

As illustrated in FIG. 4, in some embodiments, the flange 54 may include a thermal shield 66. In such embodiments, the internal fluid passage 64 of the flange 54 may be at least partially defined in the thermal shield 66. The thermal shield 66 serves as a thermal insulator between the increased temperature of compressed air 26 within the head end 38 and the relatively low temperature of fuel 28 within the fuel port 60 and the internal fluid passage 64 of the flange 54 (in this context, "relatively low temperature" meaning low with respect to the temperature of the compressed air 26). The thermal shield 66 may advantageously prevent or minimize differential thermal expansion, e.g., between the flange 54 and the end cover 36.

Still with reference to FIG. 4, a filter 67 may be positioned within the fuel port 60 such that the inlet 62 of the fuel port 60 is in fluid communication with the internal fluid passage 64 of the flange 54 via the filter 67. For example, the filter 67 may be positioned and configured such that fuel 28 flowing through the fuel port 60 must pass through the filter 67 before reaching the internal fluid passage 64. As illustrated in FIG. 5, the filter 67 may include one or more filter media 80. For example, the filter media 80 may be a fine mesh screen, a membrane, or any other suitable filter media. The structure and intended function of such filter media are generally understood by those of ordinary skill in the art and are not described in further detail herein.

Still with reference to FIG. 4, an orifice fitting 68 may be coupled to the inlet 63 of the internal fluid passage 64 of the flange 54 such that the inlet 62 of the fuel port 60 is in fluid communication with the internal fluid passage 64 of the flange 54 via the orifice fitting 68. In some example embodiments, the orifice fitting 68 may include external threads and the inlet 63 of the internal fluid passage 64 in the flange 54 may include mating internal threads such that the orifice fitting 68 can be screwed into the inlet 63 of the internal fluid passage 64 in the flange 54. In some example embodiments, the orifice fitting 68 may include one or more orifices 70 defined therein. As illustrated in FIG. 4, the fuel 28 may flow into the fuel port 60 at the inlet 62. The filter 67 may be positioned upstream of the orifice fitting 68. For example, the filter 67 may divide the lumen 82 of the fuel port 60 into a filtered portion 86 downstream of the filter 67 and an unfiltered portion 84 upstream of the filter 67. In some example embodiments, e.g., as illustrated in FIG. 4, the filter 67 may have a tapering shape, e.g., conical. The one or more orifices 70 of the orifice fitting 68 may be in direct fluid communication with the filtered portion 86, e.g., fuel 28 must pass through the filter 67 before reaching the orifice fitting 68 and passing through the one or more orifices 70 of the orifice fitting 68 into the internal fluid passage 64 of the flange 54. For example, as illustrated in FIG. 4, the filter 67 may define a tapering shape, and the orifice fitting 68 may comprise a plurality orifices 70 arranged around a narrow end of the filter 67. In some example embodiments, the filter 67 may be a conical filter ending in a point, and the orifice fitting may include a plurality of orifices 70 annularly arranged around the point of the conical filter.

In some example embodiments, the filter 67 may be integrally joined with the orifice fitting 68. For example, the filter 67 and the orifice fitting 68 may be formed as a single piece, e.g., by casting or additive manufacturing as described above with respect to the fuel port 60 and the flange 54.

The filter 67 may include a rim 81 extending around an upstream end of the filter 67. The position of the filter 67 within the fuel port 60 may be limited by an inwardly protruding lip 74 formed within the fuel port 60, where the lip 74 defines an inner diameter less than an outer diameter of the rim 81 of the filter 67. In some embodiments, the filter 67 may be installed in the fuel port 60 by passing the filter 67 through the inlet 62 of the fuel port 60 until the rim 81 of the filter 67 abuts the lip 74 of the fuel port 60. In some embodiments, a retaining ring 72 may be provided to hold the filter 67 in place. For example, the retaining ring 72 may snap fit into a recess 78 in the fuel port 60. Further, in embodiments where the filter 67 is integrally joined with the orifice fitting 68, the filter 67 may be installed by passing the filter 67 and the orifice fitting 68 through the fuel port 60 from the inlet 62 of the fuel port 60 until the orifice fitting 68 engages the inlet 63 of the internal fluid passage 64, e.g., until external threads on the orifice fitting 68 contact internal threads on the inlet 63 of the internal fluid passage, at which point the filter 67 and the orifice fitting 68 (being integrally joined) may be screwed into the inlet 63 of the internal fluid passage 64 and secured in place with retaining ring 72.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A gas turbine, comprising:
a compressor;
a turbine;
a combustor disposed downstream from the compressor and upstream from the turbine, the combustor comprising:
an outer casing;
an end cover comprising an external face outside of the outer casing, an internal face opposite the external face, a bore extending from the external face of the end cover to the internal face of the end cover, and a seal groove in the internal face of the end cover surrounding the bore of the end cover;
a flange extending between a first side and a second side opposing the first side, the flange comprising an internal fluid passage defined within the flange, the flange coupled to the internal face of the end cover with the first side of the flange abutting the internal face of the end cover whereby the first side of the flange is sealingly engaged with the internal face of the end cover via a sealing member in the seal groove in the internal face of the end cover, wherein the first side of the flange includes a bore portion that extends beyond the internal face of the end cover and into the bore;
a fuel port welded to the flange within the bore such that a weld seam is defined between the fuel port and the flange, the fuel port extending through the bore of the end cover between the flange and an inlet positioned outside of the end cover, the inlet of the fuel port in fluid communication with the internal fluid passage of the flange, the fuel port having an external diameter smaller than an interior diameter of the bore of the end cover, whereby an annular passage is defined between the fuel port and the bore of the end cover, wherein the annular passage includes an annular open end at the external face of the end cover in direct fluid communication with an ambient environment, wherein the weld seam is disposed within the annular passage, and wherein the bore portion of the first side of the flange is spaced apart from the bore and partially defines the annular passage;
an orifice fitting coupled to an inlet of the internal fluid passage of the flange such that the inlet of the fuel port is in fluid communication with the internal fluid passage of the flange via the orifice fitting, wherein the orifice fitting defines external threads and the bore portion of the flange defines internal threads, and wherein the external threads of the orifice fitting engage the internal threads of the bore portion of the flange; and
a filter extending between an upstream end and a downstream end integrally joined with the orifice fitting, the filter positioned within the fuel port such that the inlet of the fuel port is in fluid communication with the internal fluid passage of the flange via the filter and the orifice fitting.

2. The gas turbine of claim 1, further comprising a fluid conduit extending between the second side of the flange and a fuel nozzle.

3. The gas turbine of claim 1, wherein the flange comprises a thermal shield, the internal fluid passage of the flange at least partially defined in the thermal shield.

4. The gas turbine of claim 1, further comprising a protruding sealing surface on the first side of the flange, wherein the first side of the flange is sealingly engaged with the internal face of the end cover at the protruding sealing surface.

5. The gas turbine of claim 1, wherein the annular passage is only in fluid communication with the ambient environment that surrounds the gas turbine.

6. The gas turbine of claim 1, wherein the fuel port does not contact the end cover.

7. The gas turbine of claim 1, wherein the filter defines a tapering shape that narrows from the upstream end of the filter to the downstream end of the filter, and wherein the orifice fitting comprises a plurality of orifices annularly arranged around the downstream end of the filter.

8. The gas turbine of claim 7, wherein the plurality of orifices is disposed radially outwardly from the downstream end of the filter with respect to an axial centerline of the filter.

9. The gas turbine of claim 1, wherein the downstream end of the filter defines a downstream diameter, wherein the orifice fitting defines an outer diameter, and wherein the outer diameter of the orifice fitting is larger than the downstream diameter of the filter.

10. The gas turbine of claim 1, wherein the orifice fitting extends entirely downstream from the downstream end of the filter.

11. A combustor for a turbomachine, the combustor comprising:
an outer casing;
an end cover comprising an external face outside of the outer casing, an internal face opposite the external face, a bore extending from the external face of the end cover to the internal face of the end cover, and a seal groove in the internal face of the end cover surrounding the bore of the end cover;
a flange extending between a first side and a second side opposing the first side, the flange comprising an internal fluid passage defined within the flange, the flange coupled to the internal face of the end cover with the first side of the flange abutting the internal face of the end cover whereby the first side of the flange is sealingly engaged with the internal face of the end cover via a sealing member in the seal groove in the internal face of the end cover, wherein the first side of the flange includes a bore portion that extends beyond the internal face of the end cover and into the bore;
a fuel port welded to the flange within the bore such that a weld seam is defined between the fuel port and the flange, the fuel port extending through the bore of the end cover between the flange and an inlet positioned outside of the end cover, the inlet of the fuel port in fluid communication with the internal fluid passage of the flange, the fuel port having an external diameter smaller than an interior diameter of the bore of the end cover, whereby an annular passage is defined between the fuel port and the bore of the end cover, wherein the annular passage includes an annular open end at the external face of the end cover in direct fluid communication with an ambient environment, wherein the weld seam is disposed within the annular passage, and wherein the bore portion of the first side of the flange is spaced apart from the bore and partially defines the annular passage;
an orifice fitting coupled to an inlet of the internal fluid passage of the flange such that the inlet of the fuel port is in fluid communication with the internal fluid passage of the flange via the orifice fitting, wherein the orifice fitting defines external threads and the bore portion of the flange defines internal threads, and wherein the external threads of the orifice fitting engage the internal threads of the bore portion of the flange; and a filter extending between an upstream end and a downstream end integrally joined with the orifice fitting, the filter positioned within the fuel port such that the inlet of the fuel port is in fluid communication with the internal fluid passage of the flange via the filter and the orifice fitting.

12. The combustor of claim 11, further comprising a fluid conduit extending between the second side of the flange and a fuel nozzle.

13. The combustor of claim 11, wherein the flange comprises a thermal shield, the internal fluid passage of the flange at least partially defined in the thermal shield.

14. The combustor of claim 11, further comprising a protruding sealing surface on the first side of the flange, wherein the first side of the flange is sealingly engaged with the internal face of the end cover at the protruding sealing surface.

\* \* \* \* \*